(12) United States Patent
Kurtz

(10) Patent No.: US 7,578,956 B2
(45) Date of Patent: Aug. 25, 2009

(54) TOUCH FASTENERS WITH EMBEDDED PARTICLES

(75) Inventor: Wallace L. Kurtz, Lunenburg, MA (US)

(73) Assignee: Velcro Industries B.V., Curacao (AN)

( * ) Notice: Subject to any disclaimer, the term of this patent is extended or adjusted under 35 U.S.C. 154(b) by 201 days.

(21) Appl. No.: 11/832,098

(22) Filed: Aug. 1, 2007

(65) Prior Publication Data
US 2009/0033000 A1 Feb. 5, 2009

(51) Int. Cl.
B29C 51/22 (2006.01)

(52) U.S. Cl. ............... 264/167; 264/171.1; 264/172.19; 264/177.1

(58) Field of Classification Search ........................ None
See application file for complete search history.

(56) References Cited

U.S. PATENT DOCUMENTS

| 4,374,888 A | 2/1983 | Bornslaeger |
| 5,785,784 A * | 7/1998 | Chesley et al. ................ 156/66 |

* cited by examiner

Primary Examiner—Monica A Huson
(74) Attorney, Agent, or Firm—Fish & Richardson P.C.

(57) ABSTRACT

A method of making a touch fastener includes continuously introducing molten resin to a pressure zone at a peripheral surface of a rotating mold roll, such that pressure in the pressure zone forces some of the resin into an array of stem cavities defined in the mold roll to form resin stems while a remainder of the resin forms a base at the roll surface, interconnecting the stems. The method includes forming engageable heads on the stems to form fastener elements and introducing a quantity of discrete, loose particles to the resin at an entrance to the pressure zone, such that the particles become part of the base.

18 Claims, 9 Drawing Sheets

TOUCH FASTENERS WITH EMBEDDED PARTICLES

TECHNICAL FIELD

This disclosure relates to touch fasteners with embedded particles.

BACKGROUND

In general, touch fasteners include two mating components that engage and substantially retain each other. Hook and loop fasteners include: a hook component having upstanding, hook type fastener elements; and a loop component having a surface of fibers or fiber loops capable of retaining the hook type fastener elements. Some hook type fastener elements have mushroom-like heads, while some are shaped like hooks defining crooks and extending in a particular direction. Hook-engageable loop components generally include knitted, woven, and non-woven textiles. A common example of a non-woven textile is a "spun bonded" textile made by spinning fine filaments of plastic resin (e.g. polypropylene) and distributing them in superimposed layers. The fibers are bonded to each other in random orientations with a fine, low-lying, nappy layer of looped and arched fibers exposed at the surface of the fabric.

SUMMARY

In one aspect, a method of making a touch fastener includes continuously introducing molten resin to a pressure zone at a peripheral surface of a rotating mold roll, such that pressure in the pressure zone forces some of the resin into an array of stem cavities defined in the mold roll to form resin stems while a remainder of the resin forms a base at the roll surface, interconnecting the stems. The method includes forming engageable heads on the stems to form fastener elements and introducing a quantity of discrete, loose particles to the resin at an entrance to the pressure zone, such that the particles become permanently bonded to the base.

In some implementations, the method includes continuously depositing the particles onto the peripheral surface of a nip carrier roll that carries the particles into the nip to join the molten resin and become part of the base. In some instances, the nip carrier roll is the mold roll. In other instances, the nip carrier roll is a counter-rotating pressure roll, the pressure zone defined between the mold roll and the pressure roll. In some examples, the nip carrier roll defines particle cavities into which particles are received and are carried into the pressure zone. The nip carrier roll may retain the deposited particles on the peripheral surface of the roll by electro-static adhesion, a liquid, and/or a tacky substance until the deposited particles engage the liquid resin. In some instances, the peripheral surface of the nip carrier roll defines undulations capable of retaining particles. The method may also include applying a vacuum to the peripheral surface of the nip carrier roll to retain the particles. The nip carrier roll may selectively carry the deposited particles on particle retention regions defined by the roll. The particle retention region defines a pattern on the roll, in some instances, that is transferred to the base.

The method may further include continuously introducing a flexible substrate to the nip, where the base of resin is permanently laminated to the substrate in the pressure zone. The particles may be deposited (e.g. continuously or asynchronously) onto the flexible substrate, which carries the particles into the pressure zone, thereby exposing the particles to the molten resin during formation of the base, and joining the particles to the resin. The method may include orienting the deposited particles on the substrate. The substrate may retain the deposited particles by electro-static adhesion, a liquid, and/or a tacky substance until the deposited particles engage the liquid resin. The substrate may selectively carry the deposited particles on particle retention regions defined by the substrate. The particle retention region defines a pattern on the substrate, in some instances, that is imparted to the liquid resin.

In some implementations, the method includes continuously introducing a carrier sheet to the pressure zone along a peripheral surface of a rotating pressure roll. The particles are deposited onto the carrier sheet, which carries the particles into the pressure zone to join the molten resin and become bonded to the base. The carrier sheet is then removed the from the molded base. The carrier sheet may retain the deposited particles by electro-static adhesion, a liquid, and/or a tacky substance until the deposited particles engage the liquid resin. The carrier sheet may selectively carry the deposited particles on particle retention regions defined by the carrier sheet. The particle retention region defines a pattern on the carrier sheet, in some instances, that is imparted to the liquid resin.

By selectively choosing the particles and introducing them to the molten resin, the resulting formed base may advantageously achieve a coefficient of friction (MIU) of between about 0.125 and about 0.4, a frictional roughness (MMD) of between about 0.01 and about 0.2, and a geometrical roughness (SMD) of between about 1.5 µm and about 7.0 µm. In one preferred implementation, the base preferably appears cloth-like and feels cloth-like by having a coefficient of friction (MIU) of between about 0.145 and about 0.16, a frictional roughness (MMD) of between about 0.009 and about 0.015, and a geometrical roughness (SMD) of between about 4.3 µm and about 6.7 µm. In another preferred implementation, the base preferably appears cloth-like, but does not necessarily feel cloth-like by having a coefficient of friction (MIU) of between about 0.1 and about 0.25, a frictional roughness (MMD) of between about 0.003 and about 0.02, and a geometrical roughness (SMD) of between about 1.5 µm and about 4.0 µm. Instead, this base may feel relatively smooth (e.g. as with plastic tape). The base may be opaque and the particles may include colorant, carbon black, and/or a reflective material. In some examples, the particles are larger than openings of the stem cavities and may comprise resin of a melt temperature higher than a melt temperature of the molten resin.

The details of one or more implementations of the disclosure are set fourth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
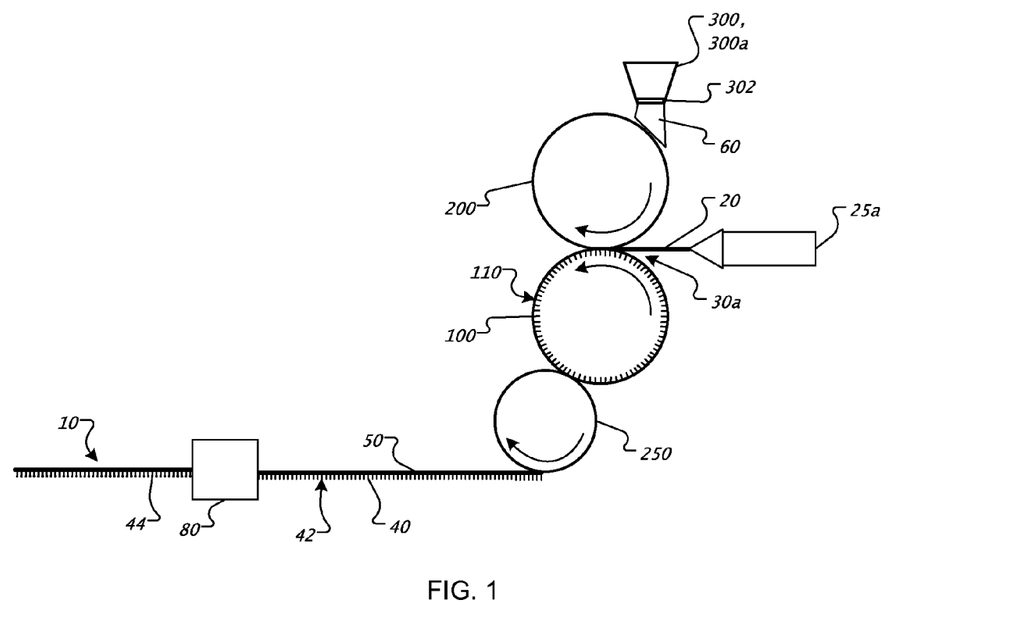
FIGS. 1-3 are schematic views of manufacturing processes for forming touch fasteners including depositing particles onto at least one of a moll roll and a pressure roll.
Figure 2:
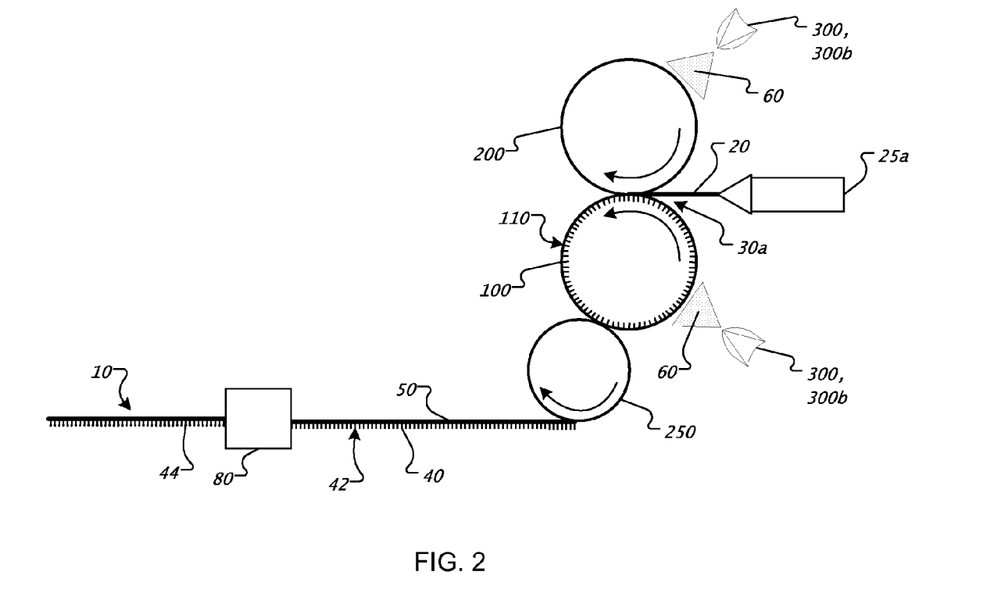
Figure 3:
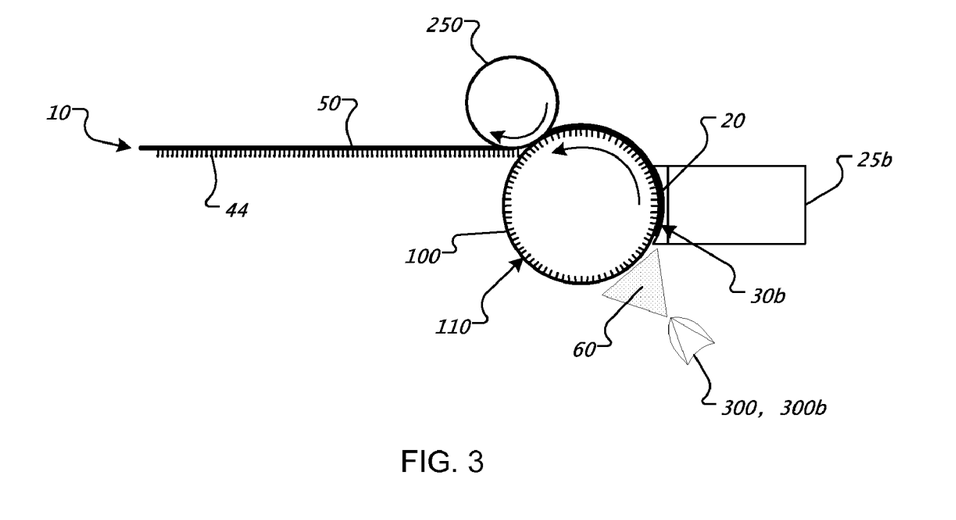

Referring to FIGS. 1-3, a method of making a touch fastener 10 includes continuously introducing molten resin 20 to a nip 30 formed adjacent a peripheral surface of a rotating mold roll 100. In some implementations, the method includes continuously introducing molten resin 20 (e.g. via an extruder 25a) to a nip 30a formed between a peripheral surface of a rotating mold roll 100 and a peripheral surface of a rotating pressure roll 200, as illustrated in FIGS. 1-2. In other implementations, the method includes continuously introducing molten resin 20 to the nip 30 from an extruder 25b to a nip 30b formed between a peripheral surface of a rotating mold roll 100 and a peripheral surface of the extruder 25b, as shown in FIG. 3. The process is similar to that described above, except only a mold roll 100 is used, i.e., no pressure roll 200 is necessary. Here, the extruder 25b is shaped to conform to the periphery of the mold roll 100 and the extruded resin 20 is introduced under pressure directly to the nip 30b formed between mold roll 100 and extruder 25b. The resin 20 at least partially fills an array of fastener cavities 110 defined in the rotating mold roll 100 to form resin stems 40 while a base 50 of resin 20 is formed interconnecting the stems 40. The molded fastener component 10 is stripped from the mold cavities 110 by a release roll 250. Further details regarding this process are described in U.S. Pat. Nos. 4,794,028, 5,781,969, and 5,913,482, the entire contents of which are hereby incorporated by reference.

Figure 4:
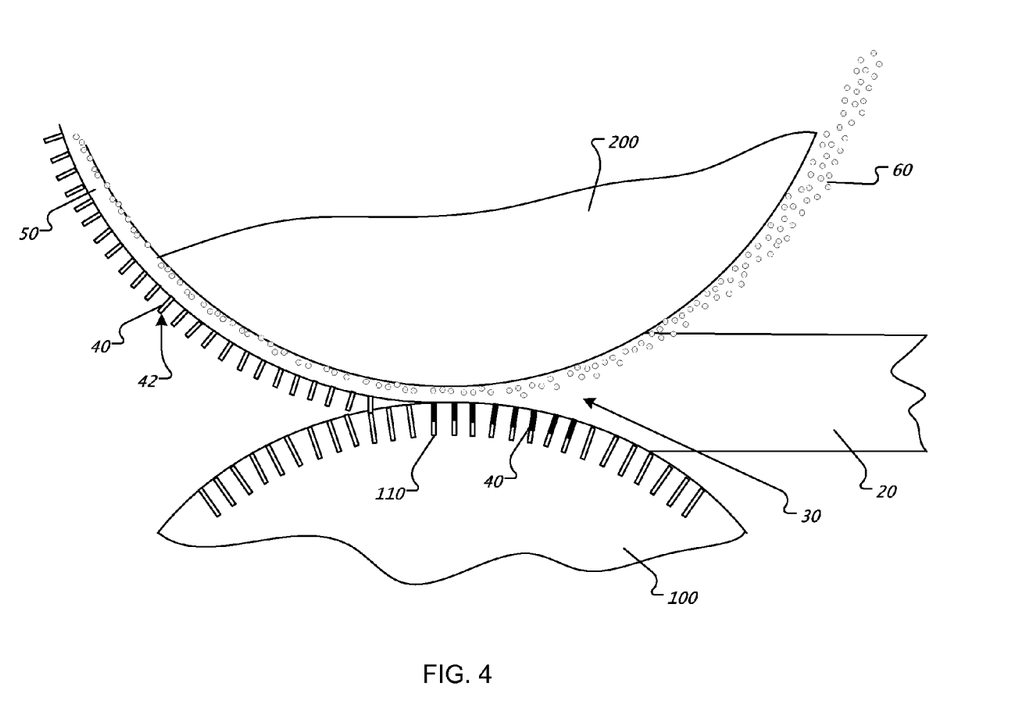
FIG. 4 is a side view illustrating adding particles to molten plastic extrusion as it enters a forming nip between first and second co-acting forming rollers.

The method includes continuously depositing discrete loose particles 60 (e.g., substantially separate, unattached, free floating particles) onto at least one of the mold roll 100 and the pressure roll 200. The loose particles 60 may be held in a hopper or bin 300 from which they are released and deposited onto the roll 100, 200. In some examples, the loose particles 60 are released from a hopper 300a, as shown in FIG. 1, in random drop patterns or though a screen or arranger 302, which directs or arranges the particles 60 in a particular pattern for deposition onto the roll 100, 200. In one example, different colored particles 60 are arranged by the arranger 302 into a multi-colored pattern (e.g. plaid). In other examples, the loose particles 60 are blown onto the roll 100, 200, as shown in FIGS. 2-3, with a particle blower 300b, providing random particle deposition onto the roll 100, 200. The roll 100, 200 carries the particles 60 into the nip 30 and deposits the particles 60 onto the molten resin 20 during formation of the base 50, as illustrated in FIG. 4. Heat and pressure in the nip 30 secure individual particles 60 to resin base 50. The deposited loose particles 60 mix with the molten resin 20 in the nip 30 during formation of the base 50. The mixing may be uniform throughout the base 50 or non-uniform with particles 60 residing in various regions of the base (e.g. near a base surface 51, 52 or about discrete regions along the base 50, etc.). In some instances, the particles 60 are sized to not enter the fastener cavities 110.

Figure 5:
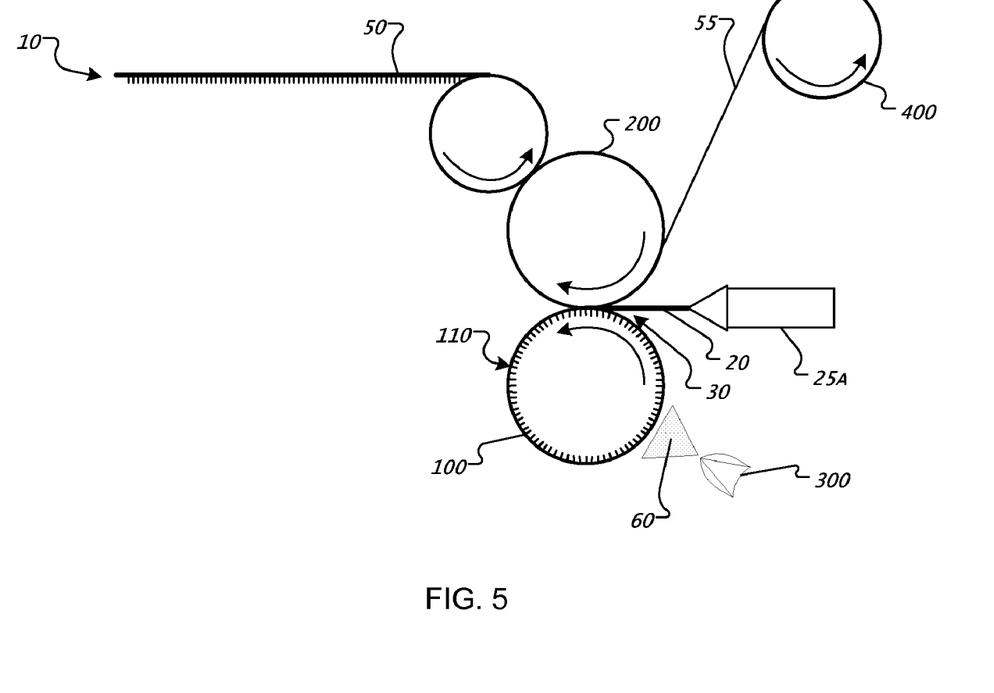
FIG. 5 is a schematic view of a manufacturing process for forming touch fasteners including continuously introducing a substrate to a forming nip.
Figure 6:
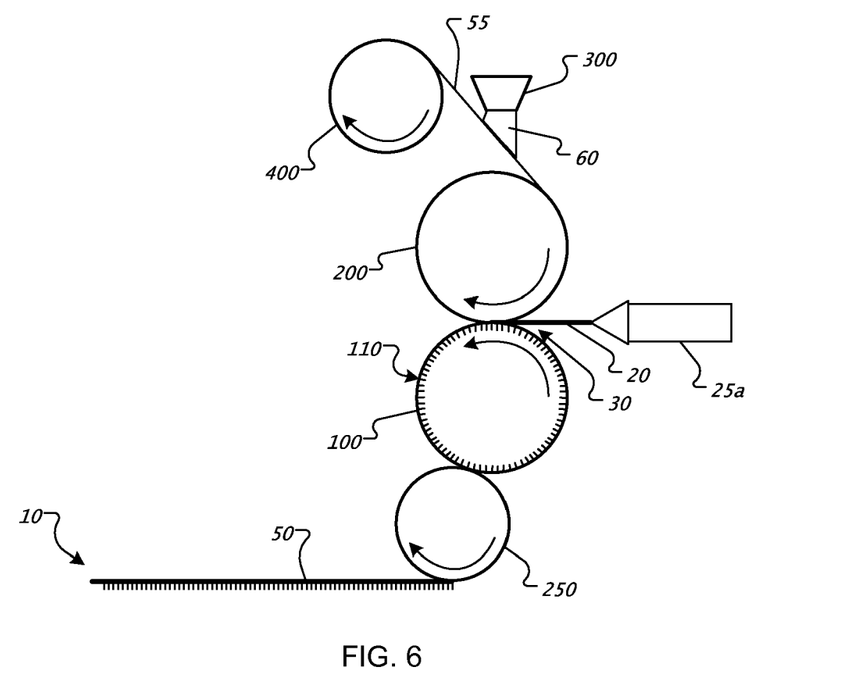
FIG. 6 is a schematic view of a manufacturing process for forming touch fasteners including continuously introducing a substrate to a forming nip and depositing particles onto the substrate.
Figure 7:
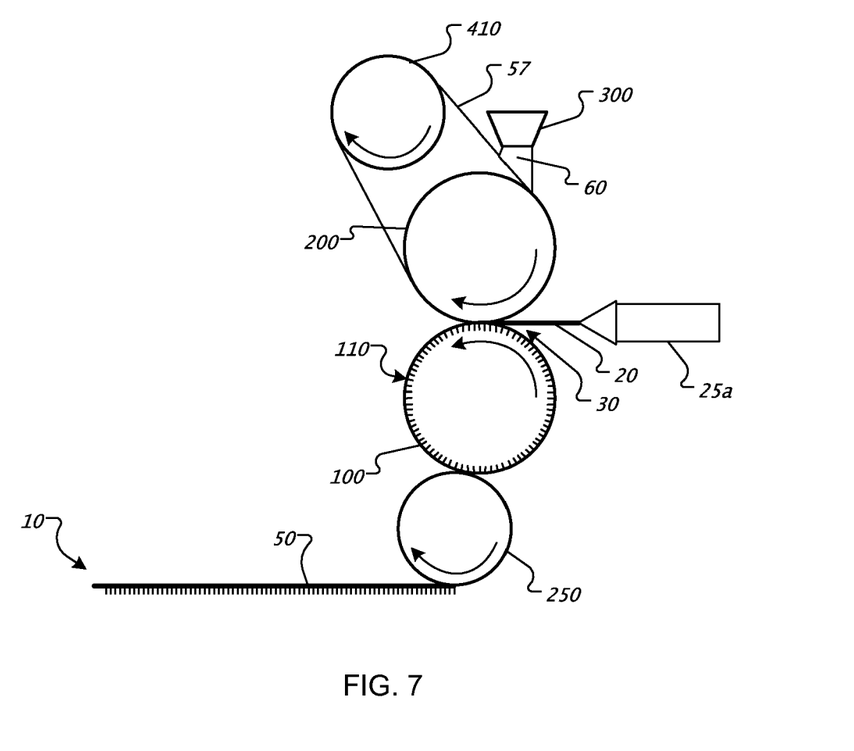
FIG. 7 is a schematic view of a manufacturing process for forming touch fasteners including depositing particles onto a carrier sheet, which carries the particles into a forming nip.

Referring to FIGS. 5-7, in some examples, the method further includes continuously introducing a flexible substrate 55 from a substrate roll 400 to the nip 30 such that the resin base 50 is laminated to the substrate 55 on the peripheral surface of the pressure roll 200. Heat and pressure in the nip 30 (also referred to as a gap) laminate and bond the substrate 55 to the thermoplastic resin 20 while simultaneously forming the fastener stems 40. The result can be a contiguous molded structure, without seams or weld lines, extending from the tips 42 of the fastener 10 into the substrate 55, where the resin can intimately bond with features or particles of the substrate 55 to form a strong, permanent bond. Further details regarding this process are described by Kennedy et al., U.S. Pat. No. 5,260,015, the disclosure of which is hereby incorporated in full by reference. In some implementations, the loose particles 60 are continuously deposited onto the substrate 55 which carries the particles 60 into the nip 30, as shown in FIG. 5, exposing the particles 60 to the molten resin 20 during formation of the base 50. The substrate 55 may have a tacky or retentive quality that retains the particles 60 on the surface of the substrate 55. Heat and pressure in the nip 30 secure the particles 60 to the resin base 50. The deposited loose particles 60 mix with the molten resin 20 in the nip 30 during formation of the base 50. The resin 20 and/or the substrate 55 may be substantially transparent to accentuate a visual appearance of the particles 60.

In the example illustrated in FIG. 6, loose particles 60 are continuously deposited onto a carrier sheet 57 which carries the particles 60 into the nip 30, exposing the particles 60 to the molten resin 20 during formation of the base 50. The loose particles 60 may be deposited in a random manner or in an arranged pattern. The carrier sheet 57 has a tacky or retentive quality that retains the particles 60 on the surface of the carrier sheet 57. In some examples, the carrier sheet 57 defines undulations or surface features that provide corresponding surface features on the molded base 50. Heat and pressure in the nip 30 secure the particles 60 to the resin base 50. The carrier sheet 57 is stripped from the molded base 50 after formation of the fastener component 10. In some examples, the carrier sheet 57 is a continuous sheet trained about the pressure roll 200 and a carrier sheet/tape roll 410.

Figure 8:
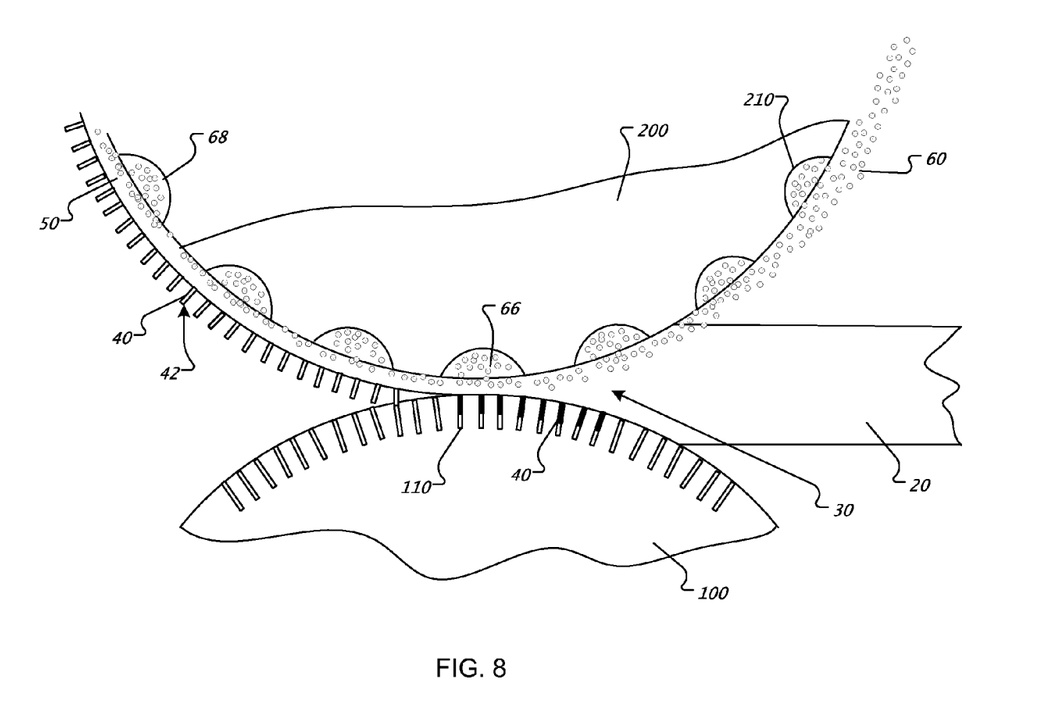
FIG. 8 is a schematic view of a pressure roll defining particle carrying cavities, as a portion of a manufacturing process for forming touch fasteners.

As illustrated in FIG. 8, the roll 100, 200 defines particle cavities 210 that carry a cluster or aggregation 66 of deposited loose particles 60 into the nip 30, such that the cluster 66 of particles 60 is substantially secured to the resin 20. In the example shown, the pressure roll 200 forms resin protrusions 68 on the base 50 in the nip 30 that encapsulate the clusters 66 of particles 60 deposited on the roll 200. The protrusions 68 on the base 50 provide a desired surface roughness or surface pattern, such as a cloth-like appearance and feel. In one example, different colored particles 60 are arranged by the arranger 302 to fall into certain undulations or cavities 210 to create a multi-colored pattern with a corresponding surface pattern.

Figure 9:
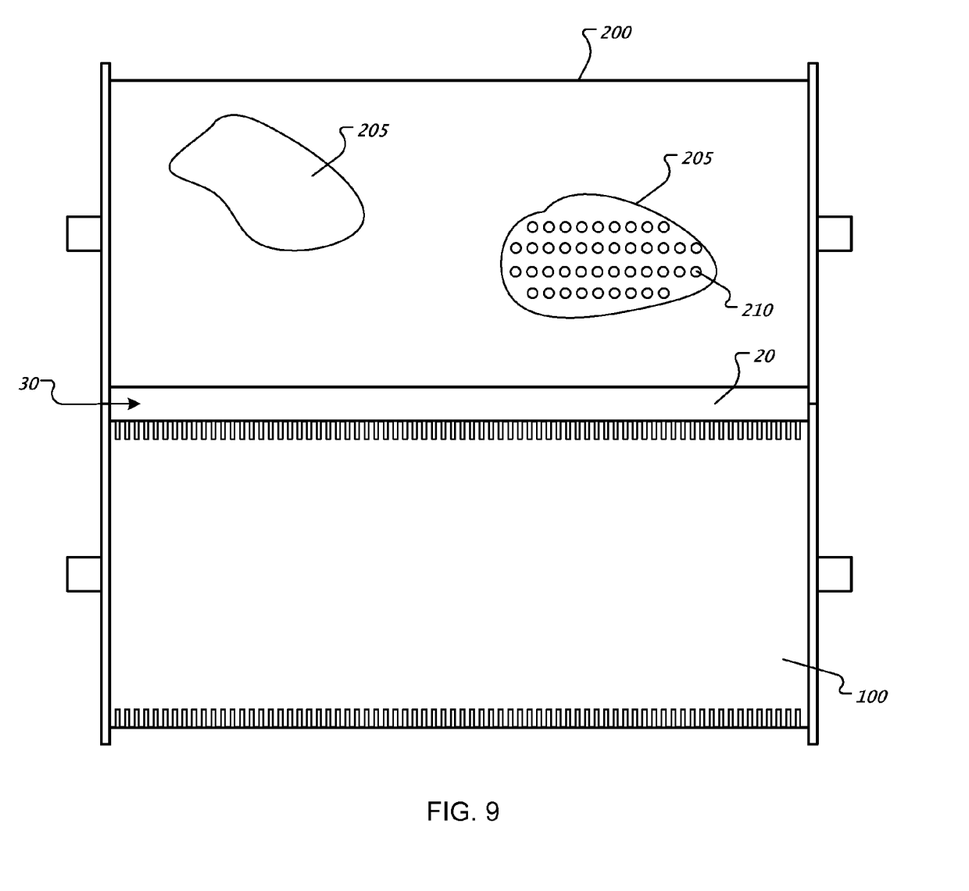
FIG. 9 is a schematic view of a pressure roll defining particle retention regions, as a portion of a manufacturing process for forming touch fasteners.

Referring to FIG. 9, in some implementations, the deposited particles 60 are retained on discrete particle retention regions 205 of the peripheral surface of the mold roll 100 and/or pressure roll 200. The retention regions 205 may be configured to define a pattern (e.g. plaid, checked, figures, etc.). In some instances, the deposited particles 60 are retained on the peripheral surface of the mold roll 100 or pressure roll 200 by other retention means, such as electro-static adhesion, surface tension, a tacky substance, or vacuum pressure, for example. In the example of electro-static adhesion, a static charge is applied to the roll 100, 200 which then attracts and retains deposited particles 60 on the peripheral surface of the roll 100, 200. When a liquid is applied to the roll 100, 200, surface tension of the liquid retains deposited particles 60 on the peripheral surface of the roll 100, 200. In the example of vacuum pressure, the roll 100, 200 defines vacuum paths 210 through or along its peripheral surface that are configured to retain deposited particles 60 on the peripheral surface of the roll 100, 200. The vacuum paths 210 are disposed in one or more of the particle retention regions 205. In some examples, the peripheral surface of the mold roll 100 and/or pressure roll 200 defines undulations 210 configured to carry the deposited loose particles 60. The undulations 210 may also be used to provide different surface characteristics of the base 50 (e.g. modified surface roughness, waviness, textured surface, embossing, etc).

Figure 10:
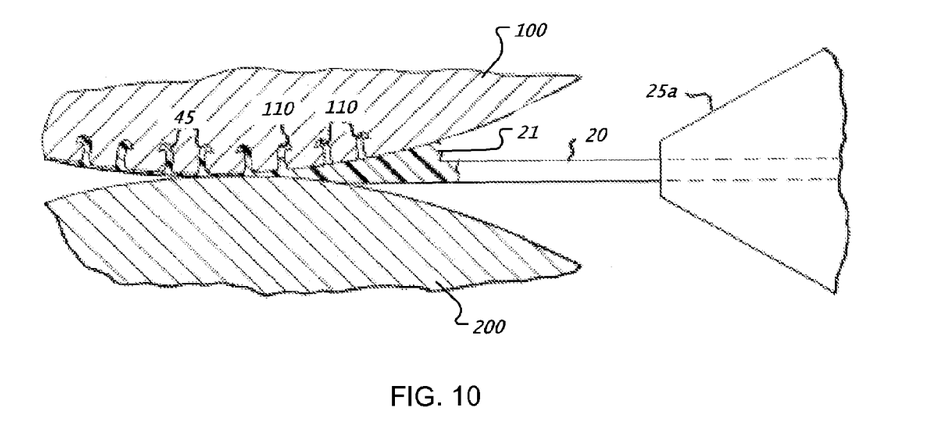
FIG. 10 is a side view, in partial cross-section, illustrating molten plastic extrusion into a forming nip between first and second coacting forming rollers.

The method includes forming stems 40 on a base 50 of resin 20. The resin 20 at least partially fills the array of cavities 110 defined in the rotating mold roll 100 to form resin stems 40 while a base 50 of resin 20 is formed interconnecting the stems 40. The forming roller 100 and the pressure roller 200 are configured to permit relief of pressure at the laterally opposite sides of their interface so that the lateral flow of plastic material at the interface is unconfined. This arrangement has been found to provide added flexibility in practicing the present method since sufficient molten plastic material can be provided in the form of extrusion 20 to assure complete filling of the hook-forming cavities 110, while at the same time excessive pressure is not created at the interface which could otherwise act to urge the rollers 100 and 200 away from each other. As will be appreciated, appropriate selection of the linear forming speeds of the fastener member 10, as well as appropriate temperature control can avoid the need for providing pressure relief at the roller interface. In this regard, it will be observed in FIG. 10 that an enlarged "bank" designated 21 is formed just upstream of the interface of the forming roller 100 and the pressure roller 200. While it is desired that the bank 21 be of minimum dimension to avoid urging the rollers 100 and 200 apart, the creation of this bank assures the presence of an adequate supply of molten plastic material for complete filling of the hook-forming cavities 110. Particles 60 applied to one of the forming rolls 100, 200 meet the bank 21 of resin 20 as the particles 60 are carried into the nip 30, where the particles 60 become integral with the formed base 50. Once transferred to the resin 20, the particles 60 are unrestrained in movement and flow. Consequently, the particles 60 may mix with resin 20 and move in one or more directions (e.g., longitudinal and/or transverse directions with respect to a feed direction).

Figure 11:
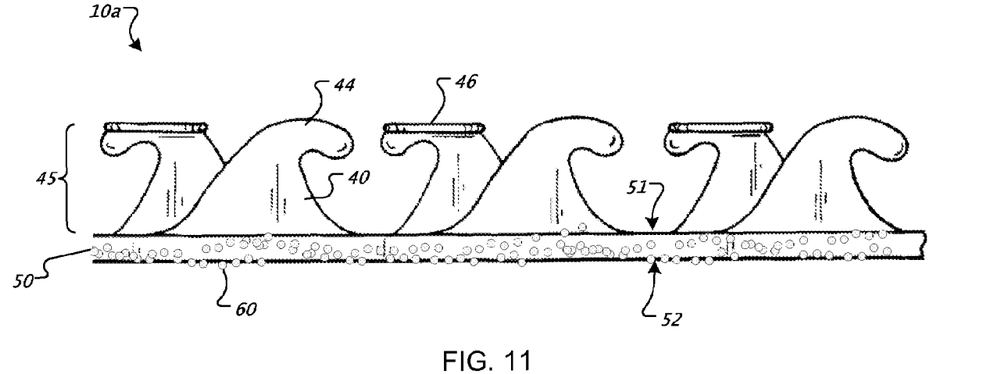
FIG. 11 is a side view of a touch fastener with an array of fastener elements and embedded particles on a bottom base surface.
Figure 12:
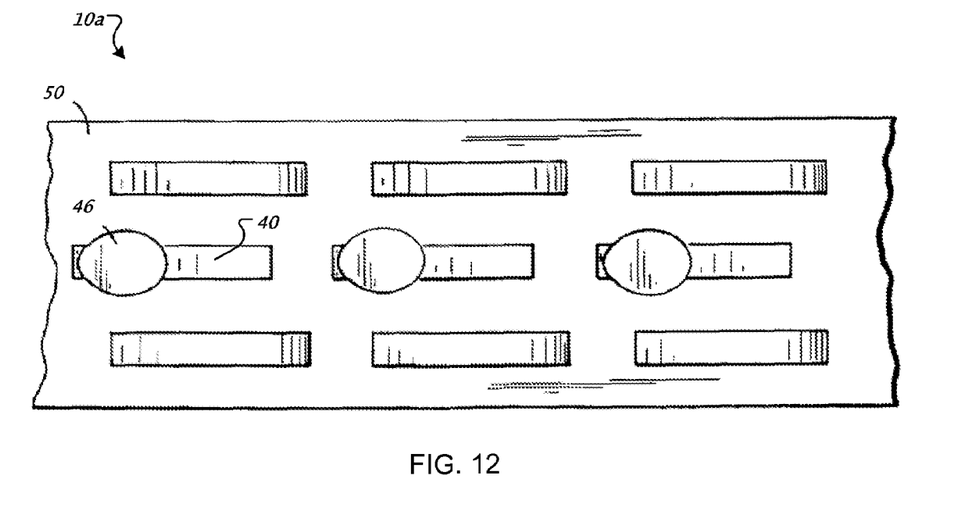
FIG. 12 is a top view of the touch fastener of FIG. 13.
Figure 13:
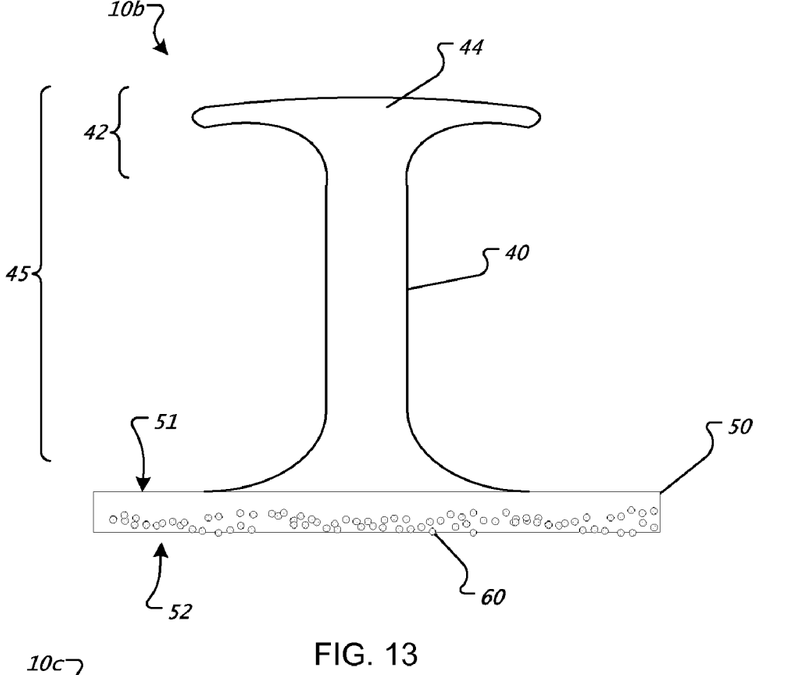
FIG. 13 is a side view of a touch fastener with embedded particles on a bottom base surface.
Figure 14:
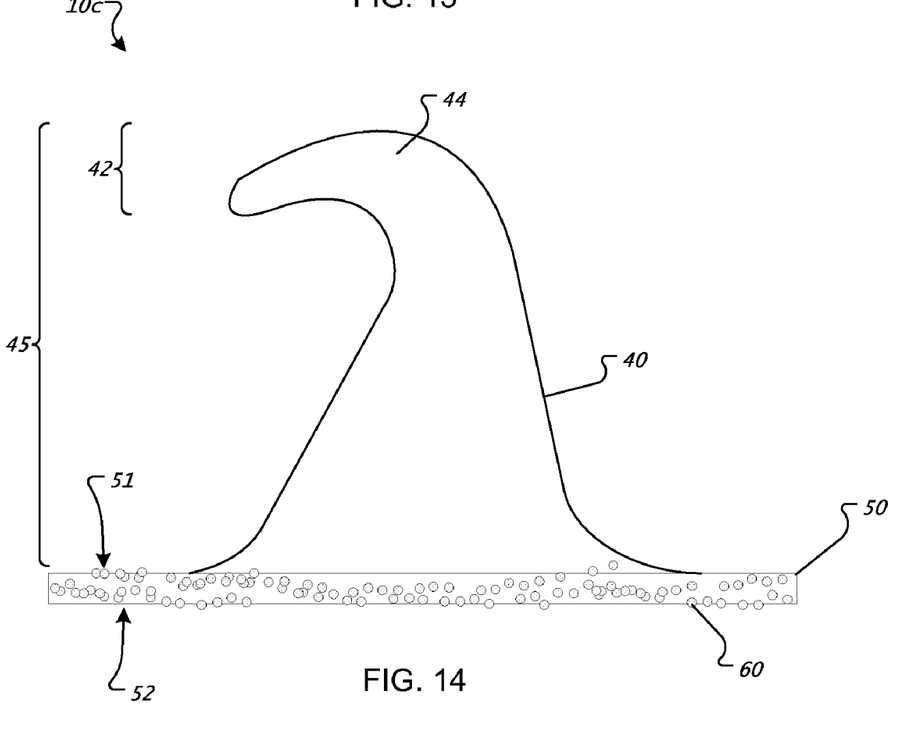
FIG. 14 is a side view of a touch fastener with embedded particles on top and bottom base surfaces, and throughout the base.
Figure 15:
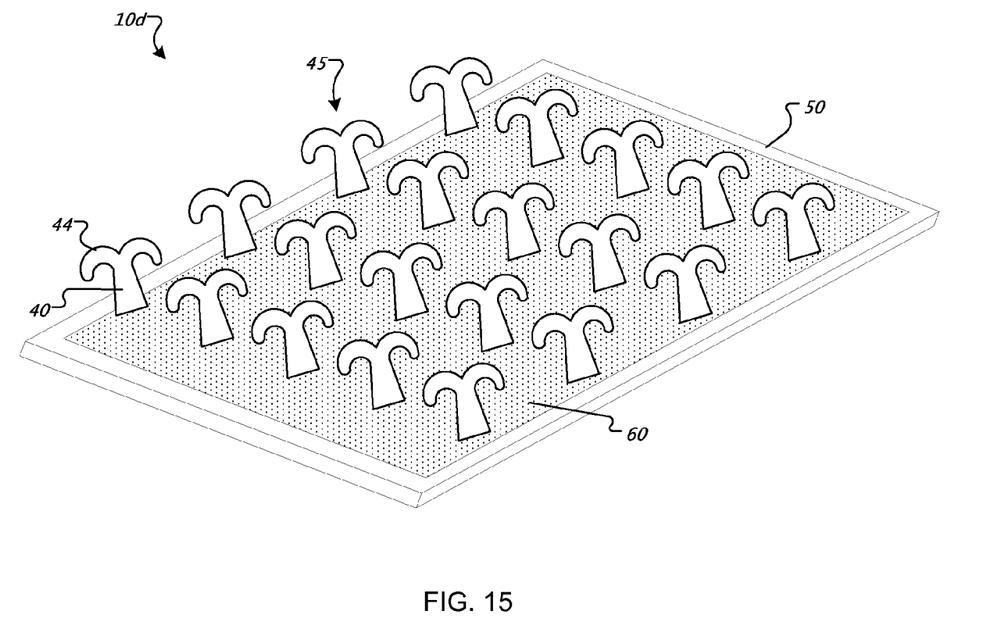
FIG. 15 is a top perspective view of a touch fastener with embedded particles visible on a base of the touch fastener.
Figure 16:
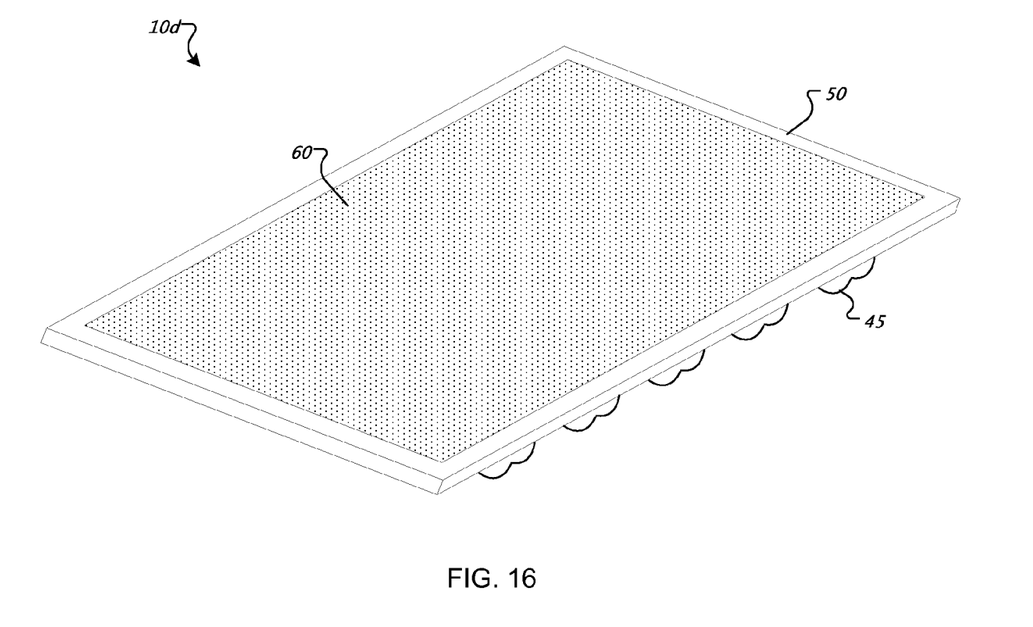
FIG. 16 is a bottom perspective view of a touch fastener with embedded particles visible on a base of the touch fastener.

Referring again to FIGS. 1-2, the method includes forming engageable heads 44 on the stem tips 42 with a tip forming device 80. In some examples, the tip forming device 80 includes a roller that flattens the stem tips 42 into engageable heads 44. Referring again to FIGS. 3 and 10, in other examples, the entire fastener elements 45, including engageable heads 44 on the tips 42 of stems 40, are formed while in the nip 30. The cavities 110 defined by the mold roll 100 are shaped to form stems 40 with engageable heads 44 on the tips 42 of stems 40. Each hook projection 45 is provided with a configuration wherein the free end portion 42 of each projection 45 extends generally radially away from and generally toward the base portion 50 of the fastener 10. It should further be noted that adjacent hook projections 45 face in generally opposite directions in a direction along the length of the fastener 10. These features of the construction promote the desired interaction with the associated multi-loop fastener element, and assure the desired gripping or fastening action between the multi-hook fastener member and the multi-loop element. The engageable heads 44 flex or rotate about the stem during release from the mold roll 100. In the example illustrated in FIGS. 11-12, engageable heads 44 of the touch fastener 10 are deformed (e.g. flattened) by a tip forming device 80 to form flat portion 46 on the engageable head 44.

Referring to FIGS. 11-16, a touch fastener 10a, 10b, 10c, 10d (e.g. as resulting from the methods of manufacture described herein) includes an elongated resin base 50 having upper and lower surfaces 51 and 52, respectively, and a plurality or array of touch fastener elements 45 extending from the upper surface 51. Particles 60 are secured to a surface 51, 52 of the base 50 and/or mixed throughout the base 50, advantageously providing a coefficient of friction (MIU) of between about 0.125 and about 0.4, a frictional roughness (MMD) of between about 0.01 and about 0.2, and a geometrical roughness (SMD) of between about 1.5 µm and about 7.0 µm. The aforementioned ranges of surface properties for the base 50 objectively characterize hand with various degrees of cloth-like appearance and feel. In one preferred implementation, the resulting base 50 appears cloth-like, feels cloth-like, and has a coefficient of friction (MIU) of between about 0.145 and about 0.16, a frictional roughness (MMD) of between about 0.009 and about 0.015, and a geometrical roughness (SMD) of between about 4.3 µm and about 6.7 µm. In another preferred implementation, the resulting base 50 appears cloth-like, but does not necessity feel cloth-like, and has a coefficient of friction (MIU) of between about 0.1 and about 0.25, a frictional roughness (MMD) of between about 0.003 and about 0.02, and a geometrical roughness (SMD) of between about 1.5 µm and about 4.0 µm. This base 50 may feel relatively smooth (e.g. as with plastic tape). Providing a resin fastener 10 with a fabric hand substantial similar to cloth is advantageous to personal care implementations, inter alia.

A number of implementations have been described. Nevertheless, it will be understood that various modifications may be made without departing from the spirit and scope of the disclosure. Accordingly, other implementations are within the scope of the following claims.

What is claimed is:

1. A method of making a touch fastener, the method comprising:

continuously introducing molten resin to a pressure zone at a peripheral surface of a rotating mold roll, such that pressure in the pressure zone forces some of the resin into an array of stem cavities defined in the mold roll to form resin stems while a remainder of the resin forms a base at the roll surface, interconnecting the stems;

forming engageable heads on the stems to form fastener elements; and depositing a quantity of discrete, loose particles onto the peripheral surface of a nip carrier roll that carries the particles into the pressure zone and introduces the particles to the molten resin at an entrance to the pressure zone, such that the particles become permanently bonded to resin of the base.

2. The method of claim 1, wherein the nip carrier roll is the mold roll.

3. The method of claim 1, wherein the nip carrier roll is a counter-rotating pressure roll, the pressure zone defined between the mold roll and the pressure roll.

4. The method of claim 1, wherein the nip carrier roll defines particle cavities into which particles are received and are carried into the pressure zone.

5. The method of claim 1, comprising retaining the deposited particles on the nip carrier roll by electro-static adhesion.

6. The method of claim 1, comprising applying a liquid to the nip carrier roll, the liquid retaining the deposited particles until the deposited particles engage the liquid resin.

7. The method of claim 1, comprising applying a tacky substance to the nip carrier roll, the tacky substance retaining the deposited particles until the deposited particles engage the liquid resin.

8. The method of claim 1, wherein the peripheral surface of the nip carrier roll defines undulations that retain the particles on the nip carrier roll upstream of the pressure zone.

9. The method of claim 1 further comprising applying a vacuum to the peripheral surface of the nip carrier roll to retain the particles.

10. The method of claim 1, wherein the nip carrier roll selectively carries the deposited particles on at least one particle retention region of the nip carrier roll.

11. The method of claim 10, wherein the particle retention region defines a pattern on the roll that is transferred to the base.

12. The method of claim 1 further comprising continuously introducing a flexible substrate to the pressure zone, such that the base of resin is permanently laminated to the substrate in the pressure zone.

13. The method of claim 12 further comprising depositing the particles onto the flexible substrate, the flexible substrate causing the particles to be carried into the pressure zone to join the molten resin and become bonded to resin of the base.

14. The method of claim 1, wherein the particles are larger than openings of the stem cavities.

15. The method of claim 1, wherein the particles comprise resin of a melt temperature higher than a melt temperature of the molten resin.

16. The method of claim 1, wherein the particles comprise colorant.

17. The method of claim 1, wherein the particles comprise carbon black.

18. The method of claim 1, wherein the particles comprise a reflective material.

* * * * *